(No Model.)

W. L. MILLS.
AXLE BOX.

No. 484,556. Patented Oct. 18, 1892.

Witnesses.
A. Ruppert.
H. A. Daniels

Inventor.
Webster L. Mills
Per
Thomas P. Simpson
atty

UNITED STATES PATENT OFFICE.

WEBSTER L. MILLS, OF CONDIT, OHIO.

AXLE-BOX.

SPECIFICATION forming part of Letters Patent No. 484,556, dated October 18, 1892.

Application filed May 16, 1892. Serial No. 433,115. (No model.)

*To all whom it may concern:*

Be it known that I, WEBSTER L. MILLS, a citizen of the United States, residing at Condit, in the county of Delaware and State of Ohio, have invented certain new and useful Improvements in Axle-Boxes; and I do hereby declare the following to be a full, clear, and exact description of the invention, such as will enable others skilled in the art to which it appertains to make and use the same.

The invention relates to axles and axle-boxes for vehicles; and it consists in the special features hereinafter described and claimed.

Figure 1:
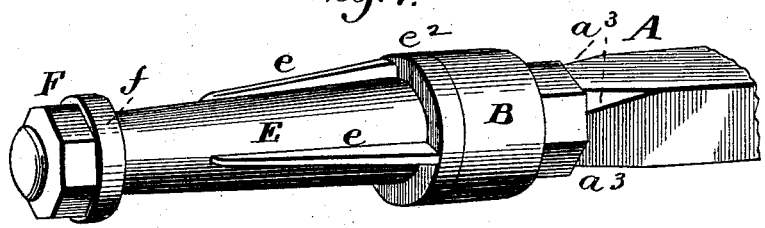
Figure 2:
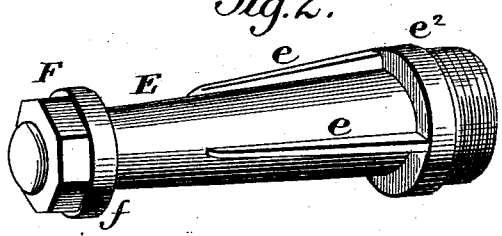
Figure 3:
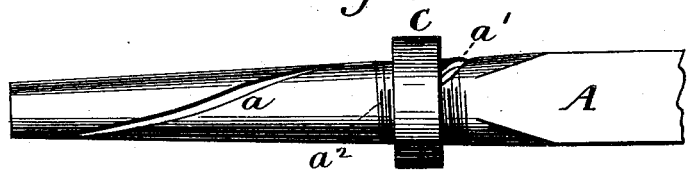
Figure 4:
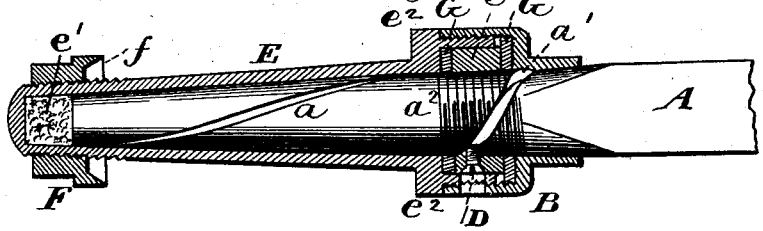

Figure 1 of the drawings is a perspective view of the axle-box on the axle; Fig. 2, a detail perspective view of the axle-box; Fig. 3, a detail view of the axle and collar; Fig. 4, a longitudinal vertical section of Fig. 1.

In the drawings, A represents the axle, whose journal is provided with the oil-channel $a$ and the set-screw channel $a'$; also the thread $a^2$.

B is a cap, which fits rearwardly against the sloping shoulder $a^3$ of the axle and is there held in place by the collar C, which screws on the axle-thread $a^2$ and is locked by a set-screw D.

E is the axle-box, whose rear end screws into the cap B, while the front end is closed, and upon it screws the cap F to hold the axle-box in the hub. On each side of the collar C, I use a washer G to secure the wearing parts of axle and axle-box from dust and mud. The cap or axle-nut F has a flange $f$, which is forced within the outer edge of the hub to prevent the axle-box from becoming loose by the fracture, wear, or torsional strain upon the usual ribs $c$. The axle-box E is made longer than the axle-journal, so as to form an oil-chamber $c'$, which is filled with cotton-waste saturated with a liquid lubricant. By a practical test I find that the oil tends from the outer to the inner end of the journal, and by means of the coiled channel $a$ keeps the journal always sufficiently lubricated. The axle-box has a shoulder $c^2$ near inner end. The object in view of screwing the collar C on the axle is to take up wear on the axle and axle-box by turning the collar and thus carrying the axle-box farther up on the sloping portion $a^3$ of the axle.

My invention is not only applicable to vehicle-wheels, but to any place where the wheel is fastened to the journal by a nut at the end thereof. It may be found in some instances advisable to fasten the collar by a rivet passing through the collar and axle or by a set-screw. The axle-box should be incased within the hub up to and even with the inner edge of the collar, while the outer end of the axle-box extends beyond the outer end of the hub and is inclosed by the hub-band.

By my invention I exclude dust, provide a self-oiler, take up wear, and prevent the escape of grease or oil about the hub of the wheel.

I claim—

The axle A, having set-screw channel $a'$, thread $a^2$, and the axle-box E, in combination with the sliding cap B, the nut-collar C, screwing thereon, and the screw D, working through the flanges of said cap and axle-box into the channel $a'$, as shown and described.

In testimony whereof I have affixed my signature in presence of two witnesses.

WEBSTER L. MILLS.

Witnesses:
F. F. MERCER,
CALVIN STRAFER.